United States Patent [19]

Bartling

[11] Patent Number: 5,619,441
[45] Date of Patent: Apr. 8, 1997

[54] HIGH SPEED DYNAMIC BINARY INCREMENTER

[75] Inventor: Steven C. Bartling, Austin, Tex.

[73] Assignee: International Business Machines Corporation, Armonk, N.Y.

[21] Appl. No.: 323,234

[22] Filed: Oct. 14, 1994

[51] Int. Cl.⁶ .................................................. G06F 7/50
[52] U.S. Cl. ............................................................. 364/770
[58] Field of Search ...................................... 364/770, 787

[56] References Cited

U.S. PATENT DOCUMENTS

| | | | |
|---|---|---|---|
| B 560,488 | 3/1976 | Kihara | 235/175 |
| 3,805,045 | 4/1974 | Larsen | 235/175 |
| 3,987,291 | 10/1976 | Gooding et al. | 235/175 |
| 3,989,940 | 11/1976 | Kihara | 364/770 |
| 4,084,254 | 4/1978 | Birney et al. | 364/766 |
| 4,110,832 | 8/1978 | Leininger et al. | 364/786 |
| 4,153,939 | 5/1979 | Kudou | 364/770 |
| 4,417,315 | 11/1983 | Russell | 364/770 |
| 4,417,316 | 11/1983 | Best | 364/770 |
| 4,700,325 | 10/1987 | Ware | 364/770 X |
| 4,853,887 | 8/1989 | Jutand et al. | 364/770 X |
| 4,905,180 | 2/1990 | Kumar | 364/787 |
| 4,982,352 | 1/1991 | Taylor et al. | 364/715.01 |
| 5,018,093 | 5/1991 | Shih | 364/740 |
| 5,027,310 | 6/1991 | Dalrymple | 364/770 |
| 5,041,742 | 8/1991 | Carbonaro | 307/452 |
| 5,095,458 | 3/1992 | Lynch et al. | 364/787 |
| 5,278,783 | 1/1994 | Edmondson | 364/787 |
| 5,299,319 | 3/1994 | Vassiliadis et al. | 395/375 |
| 5,384,724 | 1/1995 | Jagini | 364/770 |

FOREIGN PATENT DOCUMENTS 0180005  7/1986  European Pat. Off. .

OTHER PUBLICATIONS

Elliott, "Increment–Decrement Logic", IBM Tech. Discl. Bull. vol. 11, No. 3, Aug. 1968, pp. 297–298.
Miranker, "High–Speed Incrementer Using Transfer Gates," IBM Tech. Discl. Bull., vol. 25, No. 1, Jun. 1982, pp. 75–76.
"FET DRAM Look–Ahead Address Incrementor", IBM Tech. Discl. Bull. vol. 28, No. 1, Jun. 1985, pp. 71–73.
"Parallel–Array Incrementing Network", IBM Tech. Discl. Bull. vol. 27 No. 11, Apr. 1985, pp. 6450–6453.
IBM Technical Disclosure Bulletin, vol. 28, No. 1, Jun., 1985, pp. 71–73.
IBM Technical Disclosure Bulletin, vol. 28, No. 2, Jul., 1985, pp. 741–742.
T.Keung, G.A. Suarez, "Pipelining of Floating Point Multiply Unit With Common Input/Output", IBM Tech. Disc. Bull., vol. 30, No. 9, Feb. 1988, pp. 315–319.
O.O. Awsienko, D.D. Cocanougher, P.P. Nahata, "Lookahead Carry Select Adder for High Performance Computer Processors", IBM Tech. Disc. Bull., vol. 10, No. 10, Mar. 1988, pp. 331–334.
J.E. Phillips, S. Vassiliadis, "Adder Designs Suitable for Custom Implementation" IBM Tech.Discl. Bull., vol. 34, No. 8, Jan. 1992, pp. 261–262.
R.C. Wong, "Fast Carry Computation with Cascade Circuits", IBM Tech. Disc. Bull., vol. 31, No. 5, Oct. 1988, pp. 387–391.
D.W. Finney, "Passive Divide Lookahead Circuit", IBM Tech. Disc. Bull., vol. 25, No. 10, Mar. 1983, pp. 5206–5209.
S.A. Hallman, "Error Checking for a Full Carry Look-Ahead Adder" IBM Tech. Disc. Bull., vol. 27, No. 10B, Mar. 1985, pp. 6241–6248.
D.W. Finney, "Carry Propagate for Carry Save Adder", IBM Tech. Disc. Bull., vol. 25, No. 8, Jan. 1983, pp. 4282–4284.

*Primary Examiner*—Tan V. Mai
*Attorney, Agent, or Firm*—Benman Collins & Sawyer

[57] ABSTRACT

A high speed dynamic binary incrementer is provided that requires only two stages regardless of the bit width of the incrementer. The binary incrementer utilizes the inverse of logical carry expressions to provide for a first stage. A sum stage receives the inverted carry and the input signals to provide the incremented value. Dynamic wired OR Logic is utilized advantageously to provide the dynamic binary incrementer.

10 Claims, 5 Drawing Sheets

HIGH SPEED DYNAMIC BINARY INCREMENTER

FIELD OF THE INVENTION

The present invention relates to a binary incrementer and more particularly to a dynamic binary incrementer that is utilized in high speed applications.

BACKGROUND OF THE INVENTION

An incrementer can be thought of as an adder with only one input (A input) and a carry in signal. Accordingly, the incrementer adds by one to the A input through the carry in signal. Typically, dynamic binary incrementers are implemented utilizing a carry lookahead structure.

A N-bit binary incrementer traditionally requires $2+\log_2 N$ stages to implement using a binary carry lookahead structure. This approach can be illustrated by the design of a 4 bit incrementer, although the technique is most useful for large bit width incrementers. A 4 bit binary incrementer has 4 data inputs A3, A2, A1, A0 and a carry input (Cin). A 4 bit binary incrementer has 4 data outputs S3, S2, S1, S0, and a carry output (Cout). In this example, S3 represents the most significant bit, S0 represents the least significant bit.

The boolean equations describing the incrementer function are shown below:

```
Cout=GP30 & Cin
Group propagate (GP)
S3=A3 XOR C2
S2=A2 XOR C1
S1=A1 XOR C0
S0=A0 XOR Cin
where:
C2=GP20 & Cin
C1=GP10 & Cin
C0=GP0 & Cin
GP30=A3 & A2 & A1 & A0
GP20=A2 & A1 & A0
GP10=A1 & A0
GP0=A0
```

Thus, if a 4 bit incrementer were implemented with a binary carry lookahead structure it could be constructed as shown below:

```
Stage 1:  GP32=A3&A2  GP21=A2&A1  GP10=A1&A0  C0=A0&Cin
Stage 2:  GP30=GP32&GP10           GP20=GP21&A0   C1=GP10&Cin
Stage 3:  Cout=GP30&Cin            C2=GP20&Cin
Stage 4:  S3=A3 XOR C2 S2=A2 XOR C1 S1=A1 XOR C0 S0=A0 XOR Cin
```

Thus for a 4 bit incrementer, $2+\log_2 4=4$ stages of logic are required for its operation.

As can be seen from the above equations, the number of stages and the number of logic gates required to implement incrementers will increase as the number of bits in the incrementer increase. Accordingly what is needed is an incrementer which is easy to implement, and in which the number of stages required are substantially less than known dynamic incrementers. In addition, the incrementer should be easily implemented using standard logic devices. The present invention addresses such a need.

SUMMARY OF THE INVENTION

A novel logic/circuit approach to this problem has achieved an N-bit binary incrementer in 2 logic stages which is independent of the bit width of the incrementer (N).

A dynamic binary incrementer in accordance with the present invention is provided that utilizes the logical inverse of the carry expressions to provide a first stage. These carry expressions are then provided to a sum stage which sequentially receives these carry expressions and the input signals to provide the incremented value.

In a first aspect, a dynamic binary incrementer comprises; a first stage, for providing a logical inverse of a carry expression, the first stage including a plurality of carry cells, each of the carry cells for receiving an input signals and providing a carry signal, an input signal of a particular carry cell being the logical OR of complement of each input signal to the binary incrementer starting with a current bit to the least significant bit (LSB), inclusive; and the logical OR of the complement of $C_{in}$, where $C_{in}$ is the carry in to the binary incrementer. The plurality of carry cells are coupled in parallel. The binary incrementer includes a second stage, the second stage including a plurality of sum (S) cells, each of the sum cells for receiving the carry signal and an associated input signal from a corresponding one of the plurality of input cells and providing a sum output.

Through the use of an logical inverse of the carry expressions which allows for the use of dynamic OR logic elements an incrementer is provided that utilizes less stages than an equivalent carry lookahead binary incrementer. This incrementer has significant utility particularly as the binary incrementer increases in size.

DESCRIPTION OF THE INVENTION

The present invention relates to an improvement in a binary incrementer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
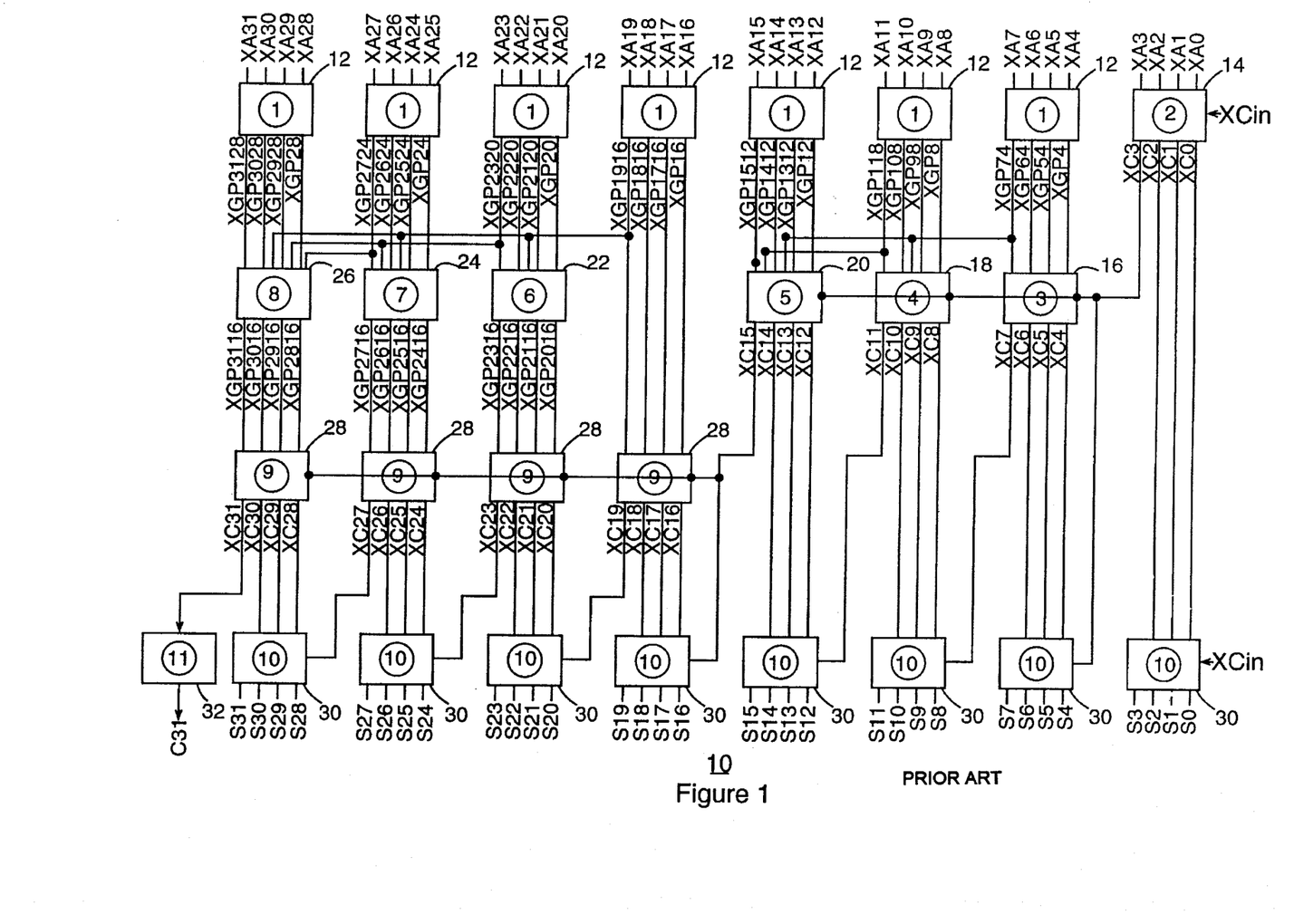
FIG. 1 is a block diagram of a conventional 32 bit binary incrementer.

To more particularly describe the operation of a conventional carry lookahead incrementer refer now to FIG. 1 and the following discussion. FIG. 1 is a block diagram of a 32 bit incrementer. The incrementer includes a plurality of cells 12 which provide for a first group of cells 14 generates a first level of carry generate signals (CG). Cells 16, 18 and 20 provide for a next level of CG signals. Cell 28 provides for a next level CG signals. Cells 22, 24 and 26 provide for an additional level of GP signals. Cell 30 provide for the sum signals. Cell 32 inverts the carry and provides an out buffer for the invention. Please find below an example of the logical functions that are in the various cells 12–32 of FIG. 1.

---
GROUP PROPAGATE (GP) CELL 12
---

Has inputs D, C, B, A where the MSB is A and forms the following outputs:
$XGP_{DLBA}=XA_D+XA_C+XA_B+XA_A$
$XGP_{LBA}=XA_C+XA_B+XA_A$
$XGP_{BA}=XA_B+XA_A$
$XGP_A=XA_A$ CARRY GENERATE (CG) CELL 14
Has inputs $XA_3$–$XA_0$ and forms the following outputs:
$XC_3=XA_3+XA_2+XA_1+XA_0+XCin$
$xc_2=XA_2+XA_1+XA_0+Xcin$
$xc_1=XA_1+XA_0+Xcin$
$xc_0=XA_0+Xcin$ CG CELL 16
Has inputs $XGP_{74}$, $XGP_{64}$, $XGP_{54}$, $XGP_4$, XC3
Outputs:
$XC_7=XCP_{74}+XC3$
$XC_6=XGP_{64}+XC3$
$XC_5=XGP_{54}+XC3$
$XC_4=XGP_4+XC3$ CG CELL 18
Has inputs $XGP_{118}$, $XGP_{108}$, $XGP_{98}$, $XGP_8$, $XGP_{74}$, XC3
Outputs:
$XC_{11}=XGP_{118}+XGP_{74}+XC3$
$XC_{10}=XGP_{108}+XGP_{74}+XC3$
$XC_9=XGP_{98}+XGP_{74}+XC3$
$XC_8=XGP_8+XGP_{74}+XC3$ CG CELL 20
Has inputs $XGP_{1512}$, $XGP_{1412}$, $XGP_{1312}$, $XGP_{1112}$, $XGP_{12}$, $XGP_{118}$, $XGP_{74}$, XC3
Outputs:
$XC_{15}=XGP_{1512}+XGP_{118}+XGP_{74}+XC3$
$XC_{14}=XGP_{1412}+XGP_{118}+XGP_{74}+XC3$
$XC_{13}=XGP_{1312}+XGP_{118}+XGP_{74}+XC3$
$XC_{12}=XCP_{12}+XGP_{118}+XGP_{74}+XC3$ GP CELL 22
Inputs: $XGP_{2320}$, $XGP_{2220}$, $XCP_{2120}$, $XGP_{20}$, $XGP_{1916}$
Outputs:
$XGP_{2316}=XGP_{2320}+XGP_{1916}$
$XGP_{2216}=XGP_{2220}+XGP_{1916}$
$XGP_{2116}=XGP_{2120}+XGP_{1916}$
$XGP_{2016}=XGP_{20}+XGP_{1916}$ GP CELL 24
Inputs: $XGP_{2724}$, $XGP_{2624}$, $XGP_{2524}$, $XGP_{24}$, $XGP_{2320}$, $XGP_{1916}$
Outputs:
$XGP_{2716}=XGP_{2724}+XGP_{2320}+XGP_{1916}$
$XGP_{2616}=XGP_{2624}+XGP_{2320}+XGP_{1916}$
$XGP_{2516}=XGP_{2524}+XGP_{2320}+XGP_{1916}$
$XGP_{2416}=XGP_{24}+XGP_{2320}+XGP_{1916}$ GP CELL 26
Inputs: $XGP_{3128}$, $XGP_{3028}$, $XGP_{2928}$, $XGP_{28}$, $XGP_{2724}$, $XGP_{2320}$, $XPG_{1916}$
Outputs:
$XGP_{3116}=XGP_{3128}+XGP_{2724}+XGP_{2320}+XPG_{1916}$
$XGP_{3016}=XGP_{3028}+XGP_{2724}+XGP_{2320}+XPG_{1916}$
$XGP_{2918}=XGP_{2928}+XGP_{2724}+XGP_{2320}+XPG_{1916}$
$XGP_{2816}=XGP_{28}+XGP_{2724}+XGP_{2320}+XPG_{1916}$ CG CELL 28
Inputs: XD, XC, XB, XA, $XC_i$, where XD is the MSB
Outputs:
$XC_D=XD+XC_i$
$XC_C=XC+XC_i$
$XC_B=XB+XC_i$
$XC_A=XA+XC_i$ ---
-continued

GROUP PROPAGATE (GP) CELL 12
---

SUM CELL 30
$Sum_i=XA_i$ XOR $XC_{i-1}$ ($Sum_i$ is MSB)
$Sum_{i-1}=XA_{i-1}$ XOR $XC_{i-2}$
$Sum_{i-2}=XA_{i-2}$ XOR $XC_{i-3}$
$SUM_{i-3}=XA_{i-3}$ XOR $XC_{i-4}$ ($Sum_{i-3}$ is MSB)

CARRY CELL 32
$C_{31}=\overline{XC_{31}}$

---

As is seen from the above example, the implementation for a 32 bit dynamic incrementer is relatively complex, requiring several different stages of GP and CG cells. In addition, it is also seen that the different cells located therein having varying functionality. Accordingly, the many different logic devices required for this varying functionality further adds to the complexity of the incrementer.

The present invention is directed toward a dynamic binary incrementer in which the number of stages is reduced and the implementation of the functionality of each stage is substantially simplified. To more particularly describe a dynamic binary incrementer in accordance with the present invention refer now to the following discussion.

To provide for ease in understanding of the principles of the present invention, the concepts thereof will be described in the context of a 4 bit dynamic binary incrementer. (In this description X will denote the logical inverse of a boolean variable.)

Accordingly, in a 4 bit dynamic incrementer in accordance with the present invention, the Carry expressions for each bit can be realized directly using a single stage as follows:

| Stage 1: | $X_{cout}=XA_3+XA_3+XA_1+XA_0+X_{cin}$ |
|---|---|
| | $XC_2=XA_2+XA_1+XA_0+X_{cin}$ |
| | $XC_1=XA_1+XA_0+X_{cin}$ |
| | $XC_0=XA_0+X_{cin}$ |

Thereafter, the sum will be implented by the following stage:

| Stage 2: | $S_3=XA_3$ XOR $XC_2$ |
|---|---|
| | $S_2=XA_2$ XOR $XC_1$ |
| | $S_1=XA_1$ XOR $C_0$ |
| | $S_0=XA_0$ XOR $X_{cin}$ |

The logic function of the new incrementer can be shown by using the following example:

| A3 | A2 | A1 | A0 | Cin |
|---|---|---|---|---|
| 0 | 1 | 1 | 1 | 1 |

The Sum and Carry output after incrementation will be:

| Cout | S3 | S2 | S1 | S0 |
|---|---|---|---|---|
| 0 | 1 | 0 | 0 | 0 |

In order to perform the increment function in accordance with the present invention, the logical inverse of A3, A2, A1, A0 and Cin will be created as shown below:

| $XA_3$ | $XA_2$ | $XA_1$ | $XA_0$ | $X_{cin}$ |
|---|---|---|---|---|
| 1 | 0 | 0 | 0 | 0 |

-continued

|  | $XA_3$ | $XA_2$ | $XA_1$ | $XA_0$ | $X_{cin}$ |  |
|---|---|---|---|---|---|---|
| $X_{Cout}=$ | 1 + | 0 + | 0 + | 0 + | 0 | =1 |
| $X_{C2}=$ |  | 0 + | 0 + | 0 + | 0 | =0 |
| $X_{C1}=$ |  |  | 0 + | 0 + | 0 | =0 |
| $X_{C0}=$ |  |  |  | 0 + | 0 | +0 |

$S_3 = 1$ XOR $0 = 1$
$S_2 = 0$ XOR $0 = 0$
$S_1 = 0$ XOR $0 = 0$
$S_0 = 0$ XOR $0 = 0$

Thus, the new incrementer provides the same result as the original equations (Note: the sum output is positive logic, while the carry output is the logical inverse of the original carry output).

Figure 2:
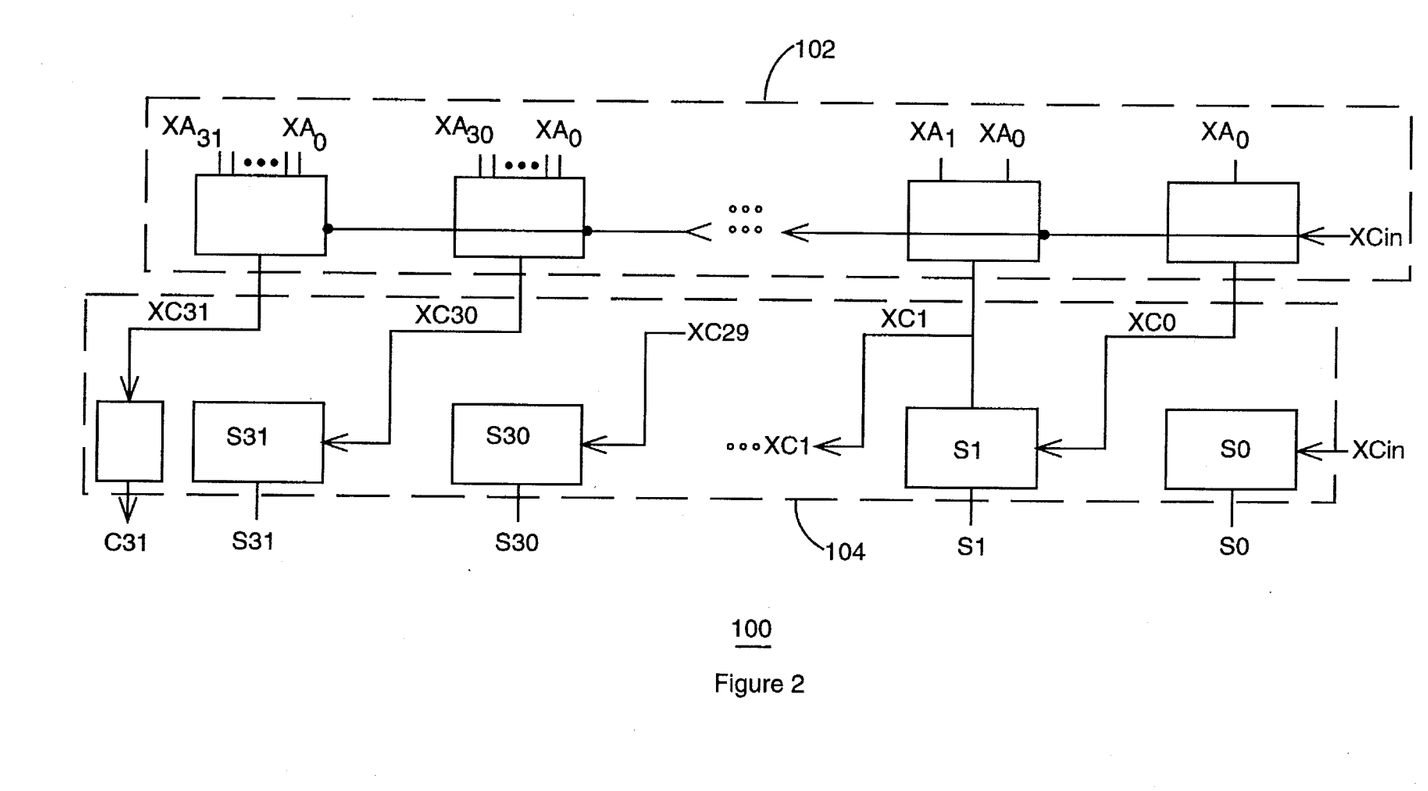
FIG. 2 is a 32 bit binary incrementer in accordance with the present invention.

To more particularly show the advantage of an incrementer in accordance with the present invention refer now to FIG. 2. What is shown in FIG. 2 is a block diagram of a 32 bit dynamic incrementer 100 in accordance with the present invention. As is seen each of the carry bits ($XC_i$) in a first carry stage 102 are implemented directly, therefore the lookahead structure associated with traditional dynamic incrementers is eliminated. A second stage 104 which comprises the sum cells which are coupled to their associated carry cells to provide the incremented sum value.

Figure 3:
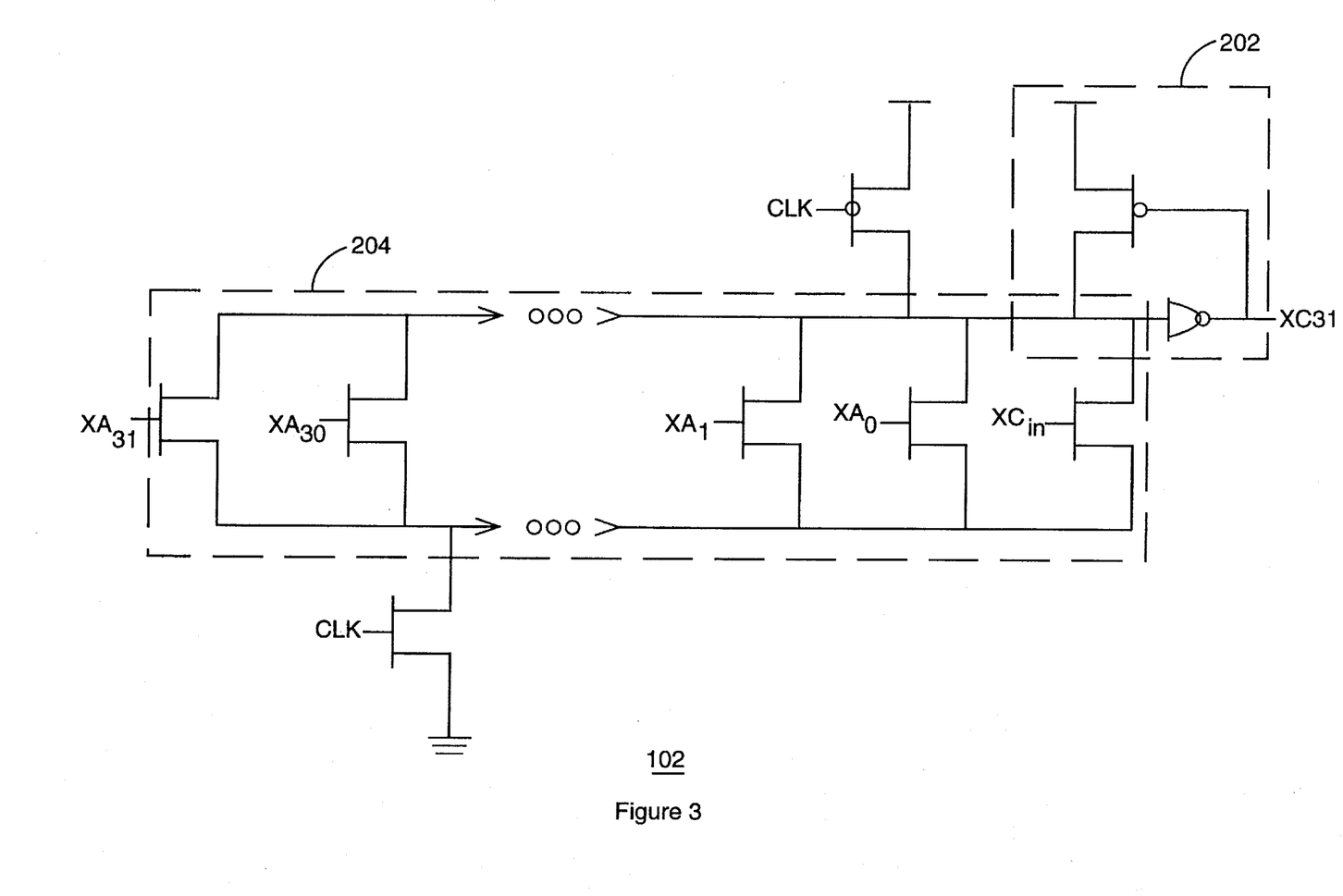
FIG. 3 is a circuit schematic of a Carry circuit in the incrementer of FIG. 2.

Referring now to FIG. 3 what is shown is one embodiment of a carry circuit 102 for the 32 bit incrementer of FIG. 2. The carry circuit 102 comprises a dynamic wired OR gate 202 coupled to a plurality of transistors 204, each of the transistors provide for one bit of the input to the carry signal ($X_{ci}$) The OR gate 202 in a preferred embodiment is a domino-type OR gate. The equation for the carry signal of the 32 bit ($XC_{31}$) is shown below:

$$XC_{31}=XA_{31}+XA_{30}+XA_{29} \ldots X_{A1}+XA_0+X_{Ci}$$

Figure 3A:
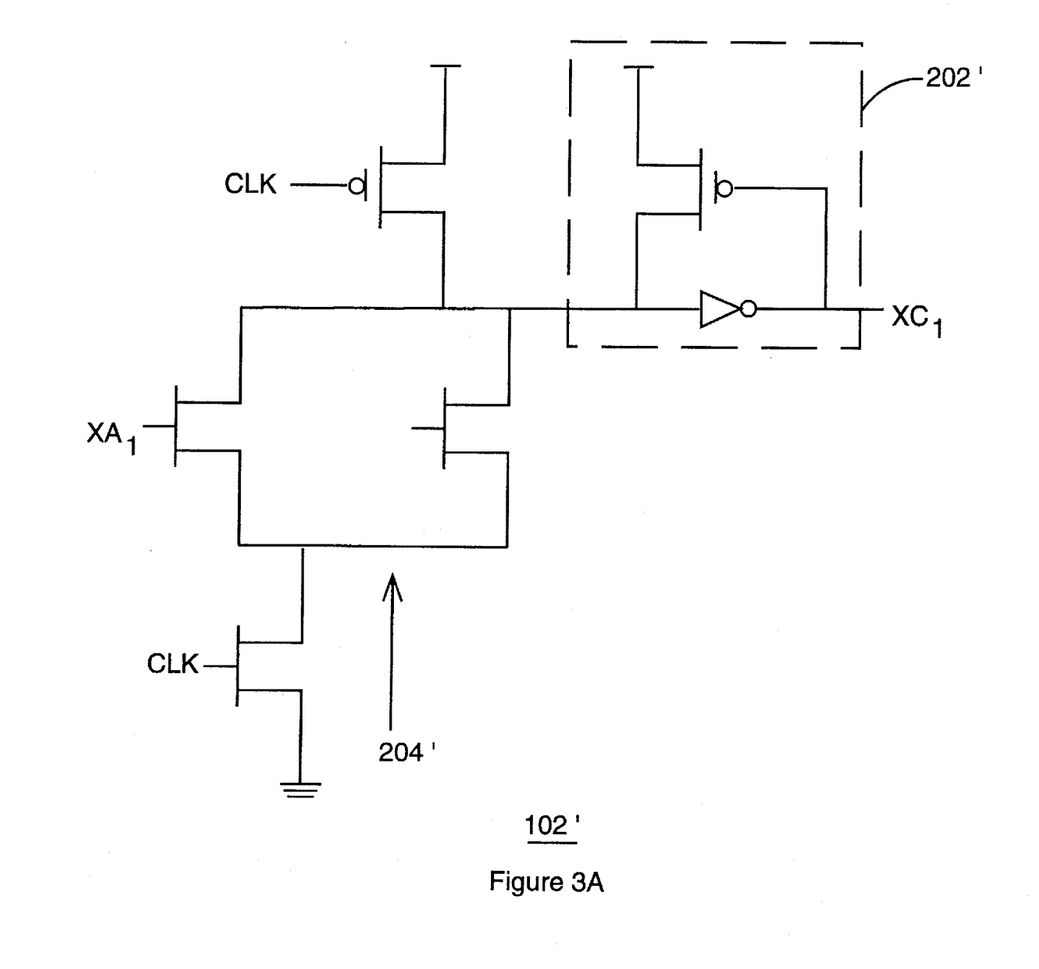
FIG. 3A is a carry circuit in accordance with the present invention.

Referring now to FIG. 3A, what is shown is a carry circuit 102', which includes the dynamic wired OR gate 202 coupled to one transistor 204 to provide one bit of the input signal to the carry cell. Starting with the least significant bit (LSB) for each additional bit of the carry signal, the carry circuit 102' can simply be increased by one transistor. Accordingly, the implementation for the carry circuit 102 is more straightforward and less complex than the carry circuit in the conventional 32 bit dynamic binary incrementer 10 including a lookahead structure shown in FIG. 1.

Figure 4:
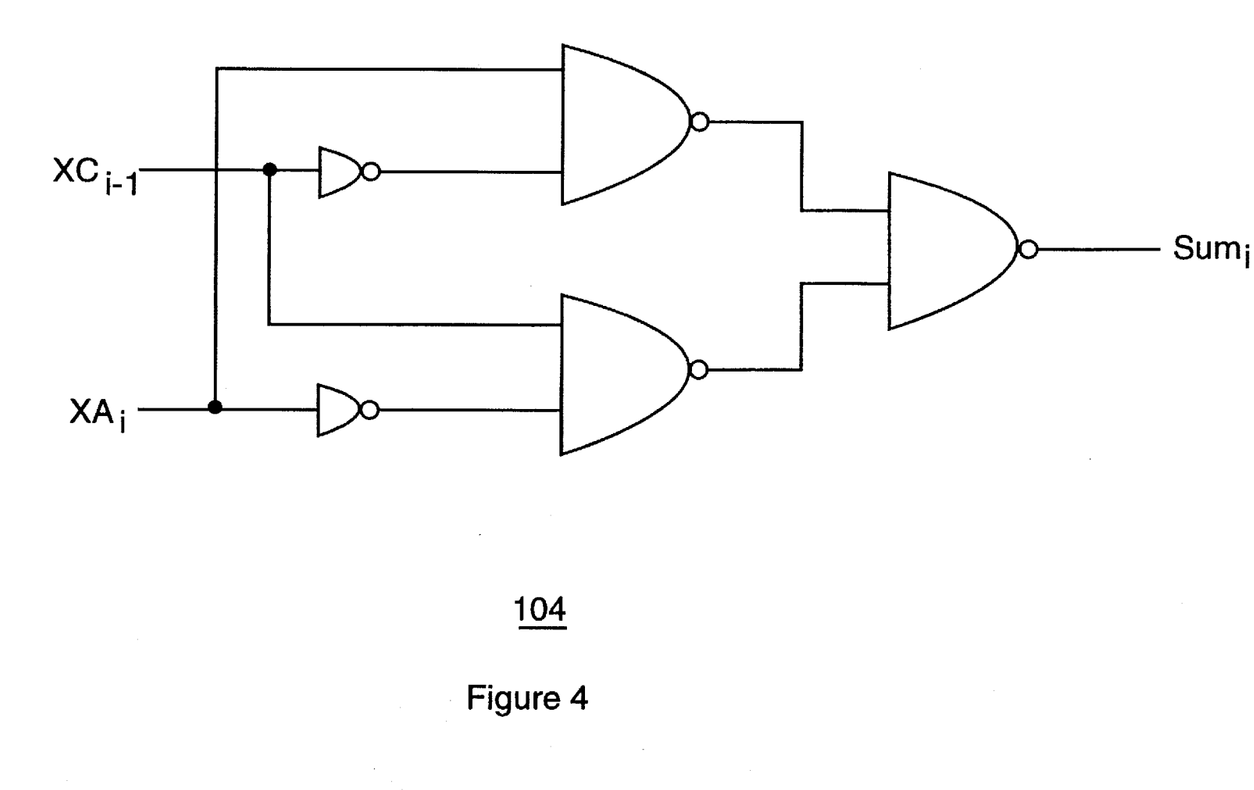
FIG. 4 is a circuit schematic of a Sum circuit in the incrementer of FIG. 2.

Referring now to FIG. 4 what is shown is an SUM stage circuit 104 which can be utilized in the dynamic 32 bit binary incrementer 100 of FIG. 2. The SUM stage circuit 104 comprises an exclusive OR function which receives the input signals and the carry signal. Accordingly the equation for the SUM ($Sum_i$) is:

$$Sum_i = XA_iC_{i-1} + A_iXC_{i-1} = XA_i \text{ XOR } XC_{i-1}$$

Accordingly, by providing a dynamic binary incrementer which implements the carry in a single stage and implements the sum signal in one stage, the complexity of a dynamic binary incrementer is significantly reduced. In addition, through the elimination of the carry lookahead structure associated with conventional dynamic binary incrementer, a dynamic binary incrementer in accordance with the present invention of the same size is significantly faster.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dynamic binary incrementer which performs an incrementation in two stages including a plurality of carry inputs and comprising:

a first stage, for providing a logical inverse of a carry expression, the first stage including a plurality of carry cells, each of the carry cells for receiving an input signal and providing a carry signal, an input signal of a particular carry cell being the logical OR of the complement of each input signal to the binary incrementer starting with a current bit to the least significant bit (LSB), inclusive; and the logical OR of the complement of $C_{in}$, where $C_{in}$ is the carry in to the binary incrementer; the input signal of the particular carry cell implemented such that there are no direct current paths between the currency inputs of the binary incrementer an he input of the particular carry cell; the plurality of carry cells being coupled in parallel; and a second stage, the second stage including a plurality of sum (S) cells, each of the sum cells for receiving the carry signal and an associated input signal value from a corresponding one of the plurality of carry cells and providing a sum output.

2. The dynamic binary incrementer of claim 1 in which the logical inverse of the carry expression comprises $X_{ci} = (XA_i + XA_{i-1} + XA_{i-2} \ldots XC_{in})$ where $A_i$ is the most significant bit (MSB) and $XC_{in}$ is a complement of the input value of the carry signal, $C_{in}$.

3. The dynamic binary incrementer of claim 1 in which the second stage comprises a sum stage circuit, the sum stage circuit providing a sum output $SUM_i$ having expression $SUM_i = XA_i$ XOR $XC_{i-1}$, where $XA_i$ is the complement of the most significant bit, and $XC_{-1}$ is a complement of the input value of the carry signal, $XC_{in}$.

4. The dynamic binary incrementer of claim 1 in which the first stage comprises a carry circuit; the carry circuit further comprising:

a dynamic wired OR gate for receiving the input signals; and a plurality of transistors coupled to the dynamic wired OR gate, each of the plurality of transistors providing one input signal to the carry cell.

5. The dynamic binary incrementer of claim 4 in which the dynamic wired OR gate is a domino OR gate.

6. The dynamic binary incrementer of claim 1 in which the second stage comprises a summing circuit, the summing circuit further comprising an exclusive OR circuit, the exclusive OR circuit receiving an input signal, a carry signal and providing an output signal therefrom.

7. A dynamic binary incrementer which performs an incrementation in two stages including a plurality of carry inputs and comprising:

a first stage, for providing a logical inverse of a carry expression, the logical inverse of the carry expression comprising $X_{ci} = (XA_i + XA_{i-1} + XA_{i-2} \ldots XC_{in})$ where $XA_1$ is the most significant bit (MSB) and $XC_{in}$ is complement of an input value of the carry signal, the first stage including a plurality of carry cells, each of the carry cells for receiving an input signal and providing a carry signal, an input signal of a particular carry cell being the logical OR of the complement of each input signal to the binary incrementer starting with a current bit to the least significant bit (LSB), inclusive; and the logical OR of the complement of $C_{in}$, where $C_{in}$ is the carry in to the binary incrementer; the input signal of a particular carry cell being implemented to prevent direct current paths between the inputs to the binary increment and input of he particular carry cell; the plurality of carry cells being coupled in parallel; and a second stage, the second stage comprises a sum stage circuit, the sum stage circuit providing a sum output $SUM_i$ having the expression $SUM_i = XA_i$ XOR $XC_{i-1}$, where $XC_{-1}$ is $XC_{in}$, the complement of $C_{in}$, the second stage including a plurality of sum (S) cells, each of the sum cells for receiving the carry signal and an associated input signal value from a corresponding one of the plurality of carry cells and providing a sum output.

8. The dynamic binary incrementer of claim 7 in which the first stage comprises a carp circuit; the carry circuit further comprising:

a dynamic wired OR gate for receiving the input signals; and a plurality of transistors coupled to the dynamic wired OR gate, each of the plurality of transistors providing one input signal to the carry cell.

9. The dynamic binary incrementer of claim 8 in which the dynamic wired OR gate is a domino OR gate.

10. The dynamic binary incrementer of claim 7 in which the second stage comprises a summing circuit, the summing circuit further comprising an exclusive OR circuit, the exclusive OR circuit receiving an input signal, a carry signal and providing an output signal therefrom.

* * * * *

UNITED STATES PATENT AND TRADEMARK OFFICE
CERTIFICATE OF CORRECTION

PATENT NO. : 5,619,441
DATED : Apr. 8, 1997
INVENTOR(S) : Bartling

It is certified that error appears in the above-identified patent and that said Letters Patent is hereby corrected as shown below:

Column 6, line 19: delete "an he", and insert --and the--.
Column 6, line 28: delete "$A_i$", and insert --$XA_i$--.
Column 6, line 59: after 2nd occurrence of "is", insert --a--.
Column 7, line 4: delete "increment", and insert --incrementer--.
Column 7, line 4: delete "he", and insert --the--.

Signed and Sealed this

Fifth Day of January, 1999

Attest:

Attesting Officer

*Acting Commissioner of Patents and Trademarks*